(12) United States Patent
Baril

(10) Patent No.: US 6,644,626 B2
(45) Date of Patent: Nov. 11, 2003

(54) SHELF DOLLY

(76) Inventor: Matthew D. Baril, 73 North St., Grafton, MA (US) 01519

( * ) Notice: Subject to any disclaimer, the term of this patent is extended or adjusted under 35 U.S.C. 154(b) by 0 days.

(21) Appl. No.: 09/870,213

(22) Filed: May 30, 2001

(65) Prior Publication Data

US 2001/0048055 A1 Dec. 6, 2001

Related U.S. Application Data

(60) Provisional application No. 60/207,447, filed on May 30, 2000.

(51) Int. Cl.⁷ .................................................. B60P 1/00
(52) U.S. Cl. .......................... 254/2 R; 254/418; 254/424
(58) Field of Search ............................... 254/418–425, 254/2 R

(56) References Cited

U.S. PATENT DOCUMENTS

| 1,342,500 | A |   | 6/1920 | Finch |
|---|---|---|---|---|
| 2,638,315 | A | * | 5/1953 | Wagner ..................... 254/420 |
| 2,950,498 | A |   | 8/1960 | Rizzuto |
| 3,858,270 | A |   | 1/1975 | Crowe |
| 4,249,282 | A |   | 2/1981 | Little |
| 4,623,125 | A | * | 11/1986 | Ebey ......................... 254/420 |
| 5,435,523 | A | * | 7/1995 | Hying et al. ............... 254/420 |
| 5,558,027 | A |   | 9/1996 | Williams et al. |
| 5,727,284 | A |   | 3/1998 | Deutsch |
| 5,791,612 | A |   | 8/1998 | King |
| 5,944,291 | A |   | 8/1999 | Kato et al. |
| 5,971,504 | A |   | 10/1999 | Kelley et al. |
| 6,213,491 | B1 | * | 4/2001 | Southard, Jr. ............... 254/420 |
| 6,302,381 | B1 | * | 10/2001 | Roll .......................... 254/420 |

FOREIGN PATENT DOCUMENTS

| EP | 0 861 738 A2 | 9/1998 |
|---|---|---|
| EP | 0 985 368 A1 | 3/2000 |

* cited by examiner

Primary Examiner—Lee D. Wilson
(74) Attorney, Agent, or Firm—John A. Kramer, Esq.; Holland & Bonzagni, P.C.

(57) ABSTRACT

A shelf dolly comprises a caster-footed pedestal base and a lifting sleeve slidably connected to the pedestal base. A shelf-leg coupling adapter, provided for removably coupling the lifting sleeve to a shelf leg, is connected to the lifting sleeve. Additionally, the shelf dolly is equipped with a jack for raising and lowering the lifting sleeve with respect to the pedestal base. To raise a shelf leg, the shelf dolly is positioned next to the leg. The lifting sleeve portion of the shelf dolly is coupled to the shelf leg using the shelf-leg coupling adapter. Subsequently, the shelf dolly's jack is operated, causing the lifting sleeve to move upwards, and the shelf leg, coupled to the lifting sleeve, to lift off the ground. To move a shelf, a shelf dolly is attached to each shelf leg.

10 Claims, 10 Drawing Sheets

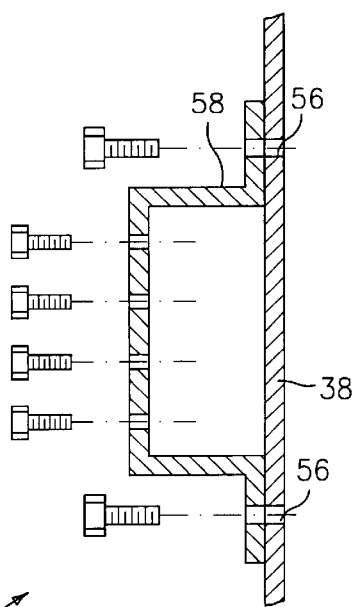
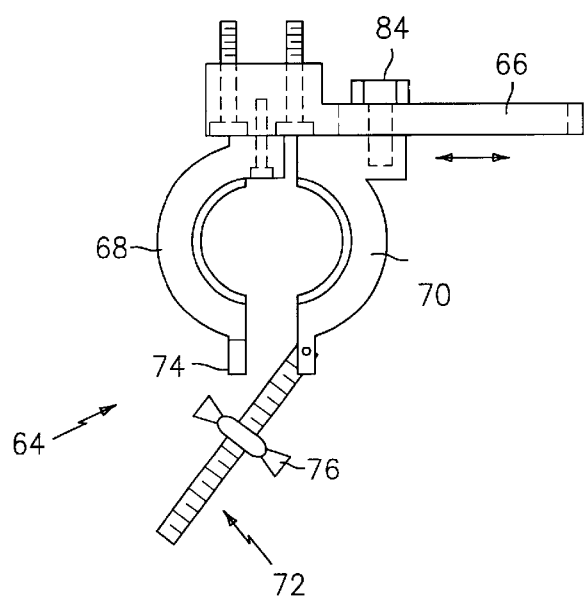
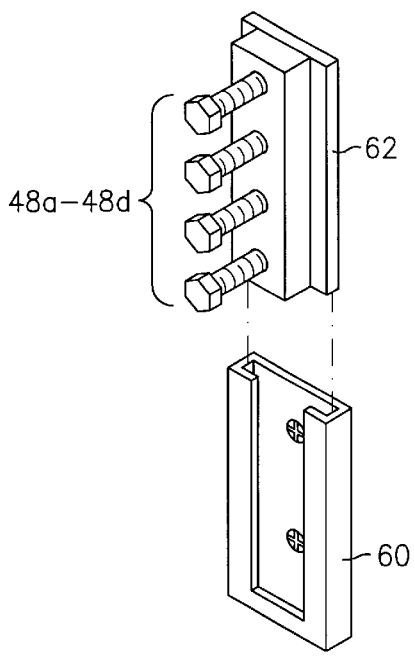
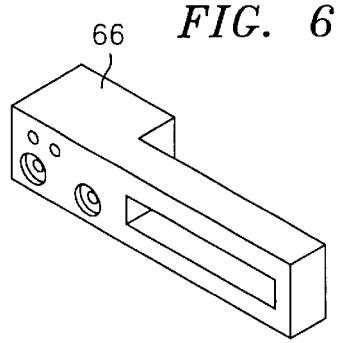
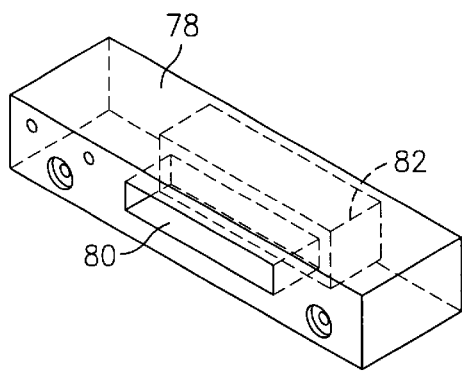
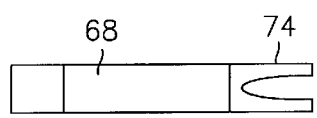
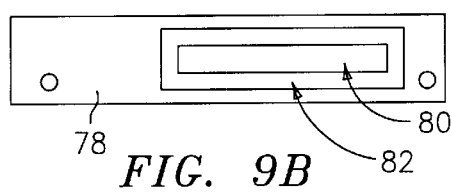
FIG. 4
FIG. 6
FIG. 5
FIG. 7
FIG. 9A
FIG. 8
FIG. 9B

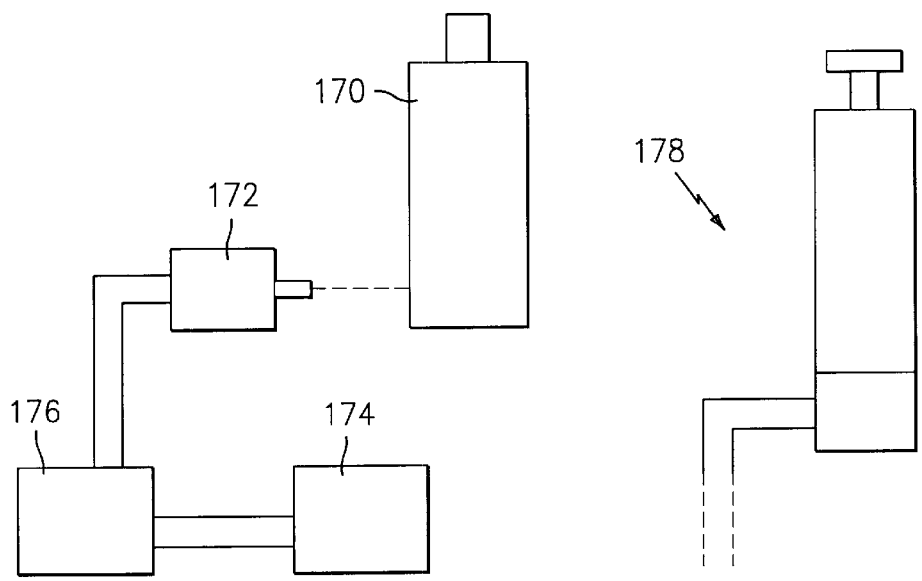
FIG. 17A
FIG. 17B
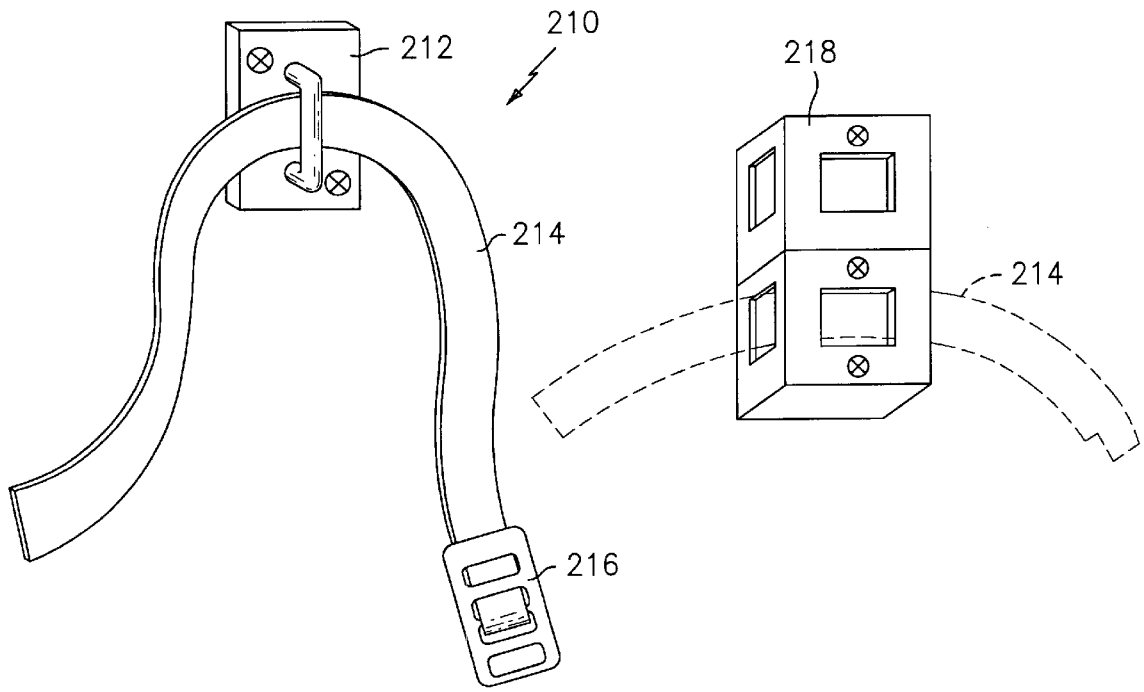
FIG. 18A
FIG. 18B

SHELF DOLLY

This application claims benefit from a Provisional Application, Ser. No. 60/207,447, filed May 30, 2000.

FIELD OF THE INVENTION

The present invention relates to devices for lifting and moving shelves or other objects.

BACKGROUND OF THE INVENTION

Typically, to rearrange the shelves in a storage area or warehouse, it is necessary to remove the inventory or items stored on the shelves, break down the shelves, move the broken-down shelves to the new location, reassemble the shelves, and place the inventory back on the reassembled shelves. This can take quite a bit of time, and is very labor and cost intensive, even for relatively modestly sized storage areas or warehouses.

Accordingly, it is a primary object of the present invention to provide a device for lifting and moving shelves and other objects without having to remove stored inventory or disassemble the shelves.

SUMMARY OF THE INVENTION

A shelf dolly according to the present invention comprises a caster-footed pedestal base and a lifting sleeve slidably disposed over the pedestal base. A shelf-leg coupling adapter is connected to the lifting sleeve for removably attaching the lifting sleeve to a shelf leg. Additionally, the shelf dolly is equipped with a jack for raising and lowering the lifting sleeve with respect to the pedestal base.

To raise a shelf leg, the shelf dolly is positioned next to the leg, with the caster contacting the ground. The lifting sleeve portion of the shelf dolly is coupled to the shelf leg using the shelf-leg coupling adapter. Subsequently, the shelf dolly's jack is operated, causing the lifting sleeve to move upwards, and the shelf leg, coupled to the lifting sleeve, to lift off the ground. To move the shelf, a shelf dolly is coupled to each shelf leg. Once all the shelf legs are lifted off the ground using the shelf dollies, the shelf can be rolled around and repositioned via the casters.

BRIEF DESCRIPTION OF THE DRAWINGS

These and other features, aspects, and advantages of the present invention will become better understood with respect to the following description, appended claims, and accompanying drawings, in which:

FIG. 4 is a cross-sectional elevation view of a removable coupling adapter offset bracket;

FIG. 5 is a perspective view of a bayonet-type coupling adapter;

FIG. 6 is a plan view of an adjustable clamp for use with round or oval shelf legs;

FIG. 7 is a perspective view of a clamp base;

FIG. 8 is an elevation view of a clamp bracket;

FIGS. 9A and 9B are perspective and elevation views, respectively, of another clamp base;

FIGS. 17A and 17B are schematic diagrams of electrically-powered jack mechanisms;

FIGS. 18A and 18B are perspective views of strap-and-buckle coupling adapters.

DETAILED DESCRIPTION OF THE PREFERRED EMBODIMENT

Figure 1:
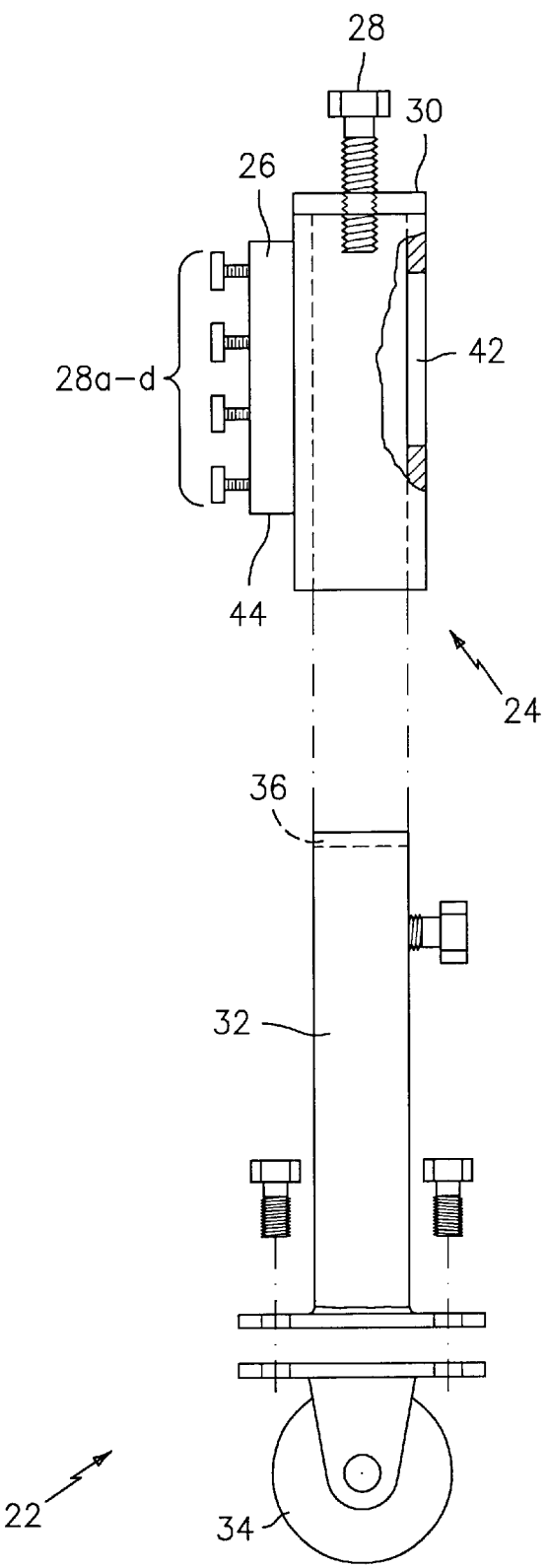
FIG. 1 is an exploded elevation view of a first embodiment of a shelf dolly.
Figures 2, 3:
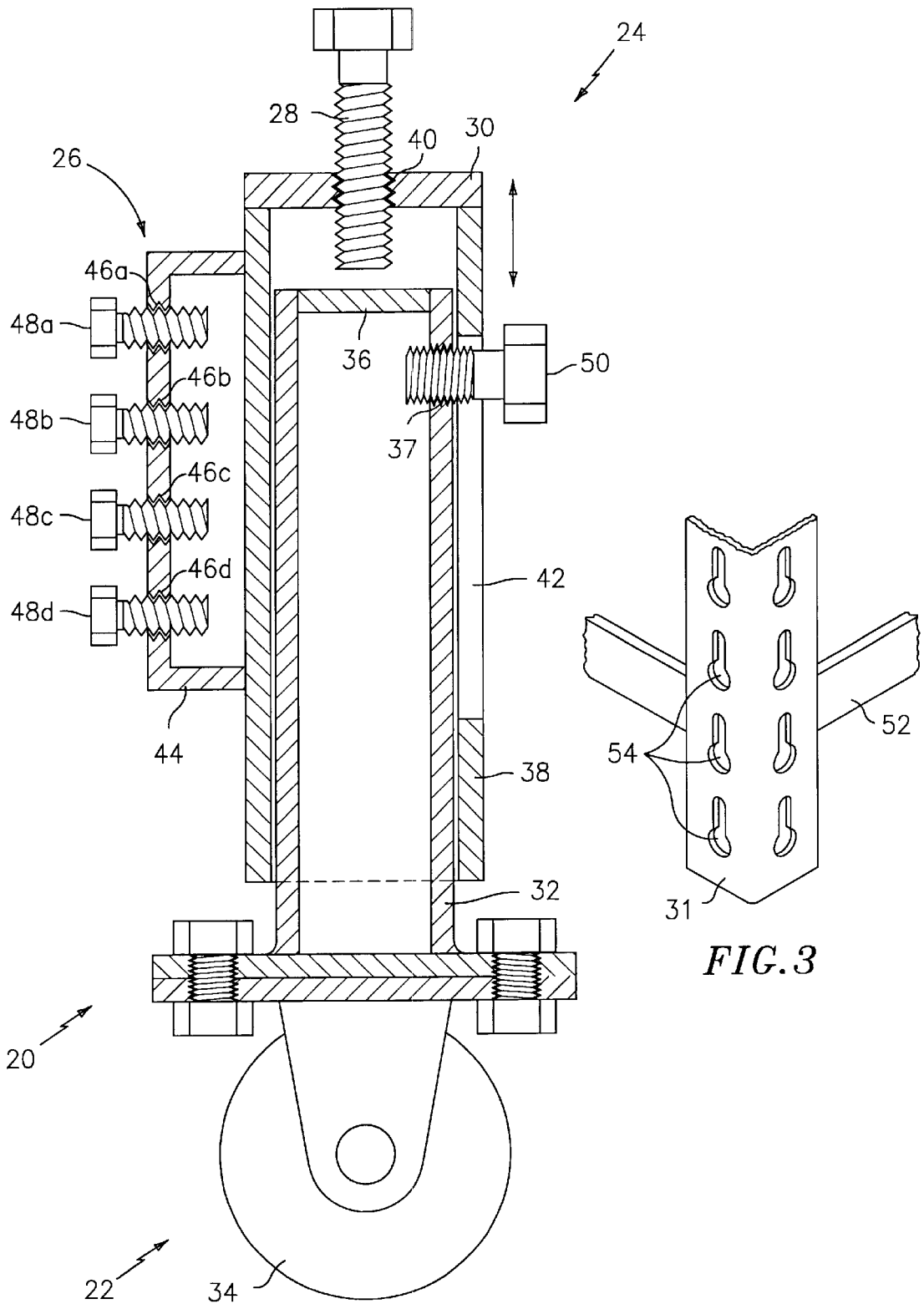
FIG. 2 is a cross-sectional elevation view of the shelf dolly shown in FIG. 1.
FIG. 3 is a perspective view of a shelf leg and shelf.

Turning now to FIGS. 1–2, a preferred or first embodiment of a shelf dolly, according to the present invention, will now be given. The shelf dolly 20 comprises a caster-footed pedestal base 22 and a mating lifting sleeve 24 placed over and slidably connected to the pedestal base 22. The lifting sleeve 24 includes a shelf leg coupling adapter 26 and a top sleeve plate 30. A screw jack 28 is threaded down through the top sleeve plate 30. To lift a shelf leg 31 (see FIG. 3), the shelf dolly 20 is coupled to the shelf leg via the coupling adapter 26, and the screw jack 28 is operated, pushing against the pedestal base 22 and thereby causing the lifting sleeve 24 and attached shelf leg to move upwards.

The pedestal base 22 comprises a length of pedestal tubing 32 connected to a caster 34 at one end. A pedestal top plate 36 is attached to the other end of the pedestal tube 32. A threaded guide hole 37 extends through the pedestal tube 32 near the pedestal top plate 36. The pedestal tube 32 may have any cross-sectional shape, as desired, e.g., round or square, and may be hollow, solid, internally-reinforced, or the like.

The lifting sleeve 24 comprises a length of hollow sleeve tubing 38 dimensioned to mate with the pedestal tube 32 (e.g., the inner dimension of the sleeve tube 38 is slightly larger than the outer dimension of the pedestal tube 32). A bottom of the sleeve tube 38 is open, while the top is closed via the sleeve plate 30 attached thereto. The sleeve plate 30 is provided with a threaded through-hole 40, into which the screw jack 28 is threaded. Additionally, one side of the sleeve tube 38 is provided with a longitudinal guide slot 42.

The shelf leg coupling adapter 26 is connected to one side of the sleeve tube 38. The coupling adapter 26 comprises an offset bracket 44 having four longitudinally-aligned, threaded holes 46a–46d disposed therein. Four coupling bolts 48a–48d are respectively threaded into the four holes 46a–46d.

To slidably connect the pedestal base 22 to the lifting sleeve 24, the latter is simply placed over the former, or, conversely, the former is inserted into the latter. Both are oriented so that the guide slot 42 aligns with the guide hole 37. Subsequently, a guide bolt 50 is inserted through the guide slot 42 and screwed partially into the guide hole 37. With the guide bolt 50 in place, the lifting sleeve 24 is free to slide up and down, but cannot be removed from the pedestal base 24. Of course, the guide bolt 50 and guide slot 42 are optional, i.e., the lifting sleeve does not have to be slidably "connected" to the base.

FIG. 3 shows a corner of one common type of modular shelf. Such a shelf typically comprises four legs 31 (only one of which is shown) periodically interconnected via shelves 52. The legs 31 are provided with longitudinally-oriented holes 54 along the lengths thereof. Typically, the holes 54 support sets of shelf hangers or the like (not shown) for easily and temporarily affixing the shelves 52 to the shelf legs 31.

To couple the shelf dolly 20 to a shelf leg 31, the shelf dolly is placed next to the shelf leg 31 with the caster 34 against the ground and the coupling bolts 48a–48d of the coupling adapter 26 aligned with the shelf leg's holes 54. For this purpose, the coupling bolts 48a–48d, which are dimensioned to fit through the leg holes 54, are spaced apart along the offset bracket 44 to match the spacing between successive leg holes 54. The lifting sleeve 24 may be manually lifted to bring the coupling bolts 48a–48d into alignment with the leg holes 54, if needed. Also, if one of the shelf legs 31 is blocked by a shelf 52, a correspondingly-positioned one of the coupling bolts 48a–48d may be removed from its respective threaded hole 46a–46d.

Once the shelf dolly 20 is aligned with the shelf leg, the coupling bolts 48a–48d are inserted through the shelf leg holes 54. With upwardly-tapering shelf leg holes, the coupling bolts 48a–48d will lock into the leg holes with the application of weight pressure once the leg is lifted. Additionally, the coupling bolts 48a–48d may be tightened to secure the shelf leg 31 against the offset bracket 44.

To lift the shelf leg 31, the screw jack 28 is operated by screwing it down through the through-hole 40, by hand or via a handle or hand or power tool (not shown). This causes the screw jack 28 to strike and exert lift pressure on the pedestal top plate 36, and, with further operation of the screw jack 28, the lifting sleeve 24 to move upwards. Consequentially, the shelf leg 31, coupled to the lifting sleeve 24, lifts off the ground. To move the shelf, each shelf leg is provided with a shelf dolly (thus, typically, four shelf dollies will be needed to move a shelf). Once all the shelf legs are jacked off the ground, the shelf may be rolled along the ground via the four casters. Once the shelf has been repositioned, the screw jacks are operated to lower the lifting sleeves and shelves.

The various components of the shelf dolly 20 are connected to one another, where applicable, in a conventional manner according to the types of materials used. For example, if steel or another metal is used, the parts may be welded to one another, or they may be fastened to one another via mechanical connectors. Additionally, where some portions of the present invention have been illustrated as comprising separate parts, one of ordinary skill in the art will appreciate that these parts could be unitarily formed in a conventional manner. For example, the pedestal tube 32 and pedestal top plate 36 could be cast molded as one piece, as could the sleeve tube 38, top sleeve plate 30, and offset bracket 44 portions of the lifting sleeve 24.

FIG. 4 shows an alternate embodiment of the shelf dolly. Here, instead of having the offset bracket 44 permanently affixed to the lifting sleeve 24, the lifting sleeve is provided with two (or more) threaded bolt-holes 56, by which a removable offset bracket 58 may be attached to the sleeve tube 38 by bolts. This allows different coupling adapters to be attached to the lifting sleeve 24, as further discussed below.

FIG. 5 shows a bayonet-type coupling adapter. Here, a closed-bottomed receiving bracket 60 is attached (permanently or removably) to the lifting sleeve 24. A flanged coupling insert 62 is dimensioned to fit in the receiving bracket, and includes the set of longitudinally-oriented coupling bolts 48a–48d threaded therein (e.g., like the configuration shown in FIG. 2). The coupling insert 62 may be secured in the receiving bracket 60 via a mechanical connector (not shown), but this is not strictly necessary since the coupling insert 62 will be held in place against the bottom of the receiving bracket 60 by gravity or the weight of a shelf.

Although the shelf legs 31 shown in FIG. 3 are quite common, there are numerous other types of shelf legs. For example, shelf legs may be round, square, L-shaped, or odd-shaped. Therefore, instead of coupling bolts 48a–48d, the coupling adapter 26 may be provided with different mechanisms ("couplers") for coupling the shelf dolly to different types of shelf legs. As should be appreciated, these other types of couplers may be attached directly to the sleeve tube 38 (without an offset bracket), or they may be attached to the offset bracket 44 (FIG. 1), the removably-attached bracket 58 (FIG. 4), or the bayonet-mounted coupling insert 62 (FIG. 5), or the like, in place of the coupling bolts 48a–48d. For this purpose, the brackets 44, 58 or insert 62 may be provided with additional threaded holes (not shown), or the couplers may be attached via the coupling-bolt holes 46a–46d. Of course, the couplers may be permanently affixed to their own, dedicated brackets. For example, a shelf dolly having the coupling adapter of FIG. 5 could be provided with two different flanged coupling inserts 62: one with the coupling bolts 48a–48d and another with some other coupler attached thereto (see, e.g., FIG. 19D).

A coupler for use with round or oval shelf legs is shown in FIG. 6 as an adjustable clamp 64. The clamp 64 comprises a clamp base 66 (also shown in FIG. 7), a stationary clamp bracket 68 (also shown in FIG. 8) affixed to the base 66, and an adjustable clamp bracket 70 slidably connected to the base 66. Additionally, a clamp arm 72 is pivotally attached to the adjustable clamp bracket 70. The clamp 64 is attached to the lifting sleeve 24, either directly to the sleeve tube 38 or to the brackets 44, 58 or insert 62, as discussed above. Of course, multiple clamps 64 may be attached to the lifting sleeve 24.

To couple the shelf dolly 20 to a round or oval shelf leg using the clamp 64, the adjustable clamp bracket 70 is slid away from the stationary clamp bracket 68, and the dolly is positioned so that the stationary clamp bracket 68 extends around one side of the shelf leg. Subsequently, the adjustable clamp bracket 70 is slid towards the stationary bracket 68 until the adjustable bracket 70 abuts the shelf leg. Then, the clamp arm 72 is pivoted to slip into an open-ended slot arm 74 extending out from the stationary bracket 68, and is secured thereto, e.g., via a wing nut 76 or the like.

FIGS. 9A and 9B show an alternative clamp base 78 for use with the clamp 64. Here, instead of being L-shaped, the clamp base 78 is block-shaped. Additionally, instead of a single slot, it has a narrow slot 80 extending into a wide slot 82, wherein a slide bolt 84 (e.g., as shown in FIG. 6) would ride in the wide slot 82 and extend through the narrow slot 80 for slidably connecting the adjustable clamp bracket 70 to the base 78. As also shown in FIGS. 9A and 9B, the clamp bases 66, 78 may be attached to the lifting sleeve 24 at either end instead of one end, as is shown in FIGS. 6 and 7.

Figure 10:
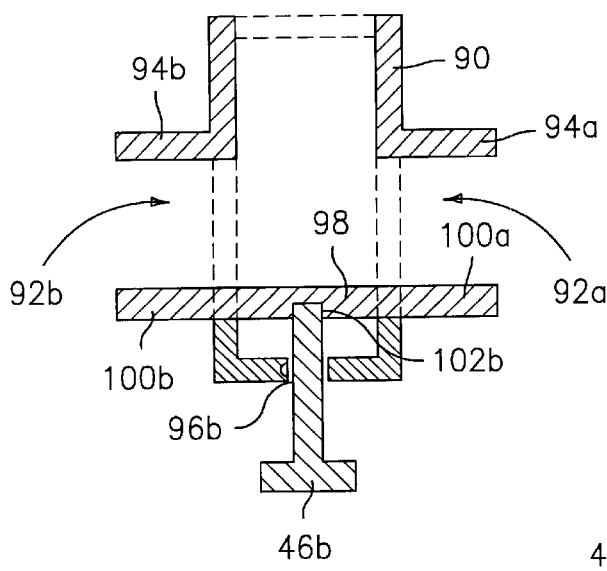
FIG. 10 is a cross-sectional plan view of a quick-release shelf-leg coupling adapter also shown in FIG. 11.
Figure 11:
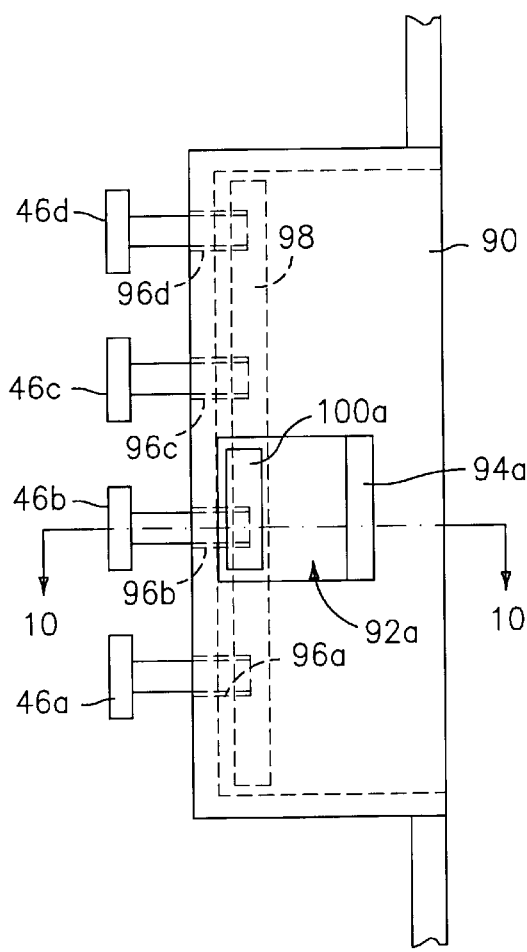
FIG. 11 is an elevation view of the quick-release coupling adapter shown in FIG. 10.
Figure 12:
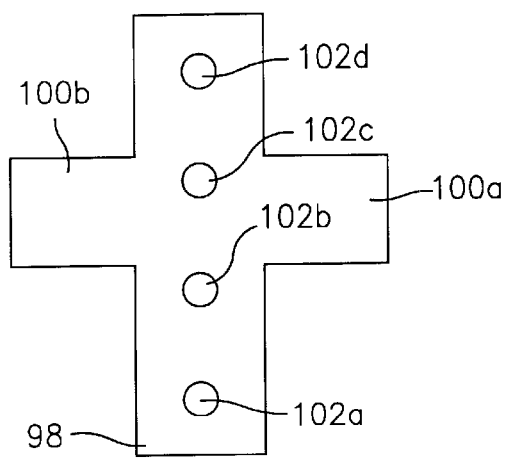
FIG. 12 is an elevation view of a t-shaped plate.

As mentioned above, the coupling bolts 46a–46d may be screwed down to secure a shelf leg against the brackets 44, 58, the insert 62, or whatever else the coupling bolts 46a–46d are threaded into. FIGS. 10–12 show a first "quick-release" mechanism by which the coupling bolts 46a–46d may be easily moved as one to more quickly secure a shelf leg. Here, a "quick-release" offset bracket 90 is attached to the sleeve tube 32, either permanently or removably via screws, a bayonet-mount, or the like. The quick-release bracket 90 has two side slots 92a, 92b, and two side wings 94a, 94b located adjacent the rear sides of the slots 92a, 92b. Additionally, the front of the bracket 90 is provided with four linearly-arrayed, non-threaded holes 96a–96d. A t- or cross-shaped plate 98 is slidably disposed within the bracket 90, with the plate arms 100a, 100b extending out through the slots 92a, 92b, respectively. The four coupling bolts 46a–46d extend respectively through the non-threaded holes 96a–96d, and are screwed into the plate 98 via threaded holes 102a–102d, provided in the plate 98, which align with the non-threaded holes 96a–96d.

The plate 98, with the bolts 46a–46d attached thereto, can slide within the bracket 90 between a first position (shown in FIGS. 10 and 11), wherein the plate 98 abuts the inside front of the bracket 90, and a second position (shown in FIGS. 13A–13D), wherein the plate 98 is near (or abuts) the side wings 94a, 94b. In the second position, the heads of the coupling bolts 46a–46d lie near the outside front of the offset bracket 90. To couple the shelf leg to the shelf dolly 20 and secure a shelf leg 31 against the offset bracket 90, the plate 98 is moved to its first position, the coupling bolts 46a–46d are inserted into the shelf leg holes 54, and the plate 98 is moved to its second position.

Figure 13A:
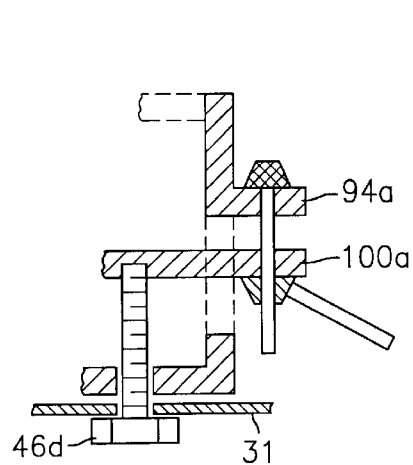
FIGS. 13A–13D are various plan views of a portion of the coupling adapter shown in FIGS. 10–12 in use with various quick-release mechanisms.
Figure 13C:
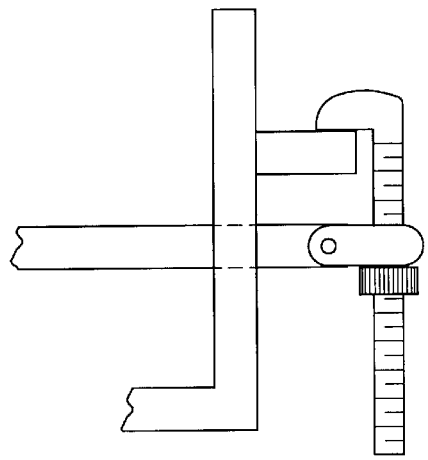
Figure 13B:
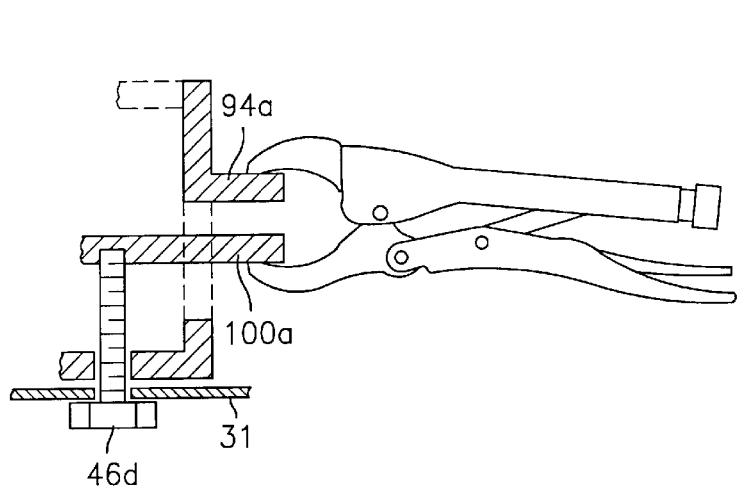
Figure 13D:
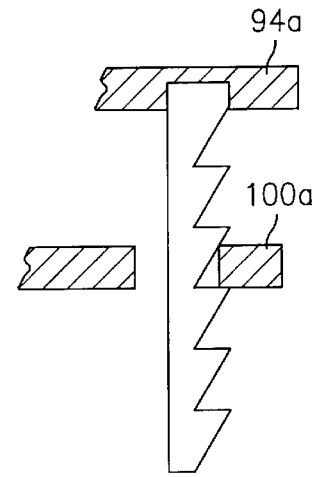

The plate 98 may be kept stationary by mooring the plate arms 100a, 100b to the side wings 94a, 94b. For this purpose, many different quick-release mechanisms may be employed. For example, adjustable quick-release shafts and bolts may be provided, as in FIG. 13A, or adjustable clamp-wrenches (vice grips) may be used, as in FIG. 13B. Additionally, attached, adjustable latches or clamps may be provided, as in FIG. 13C, or biased, flexible plastic arms may be used, as shown in FIG. 13D.

Figure 14A:
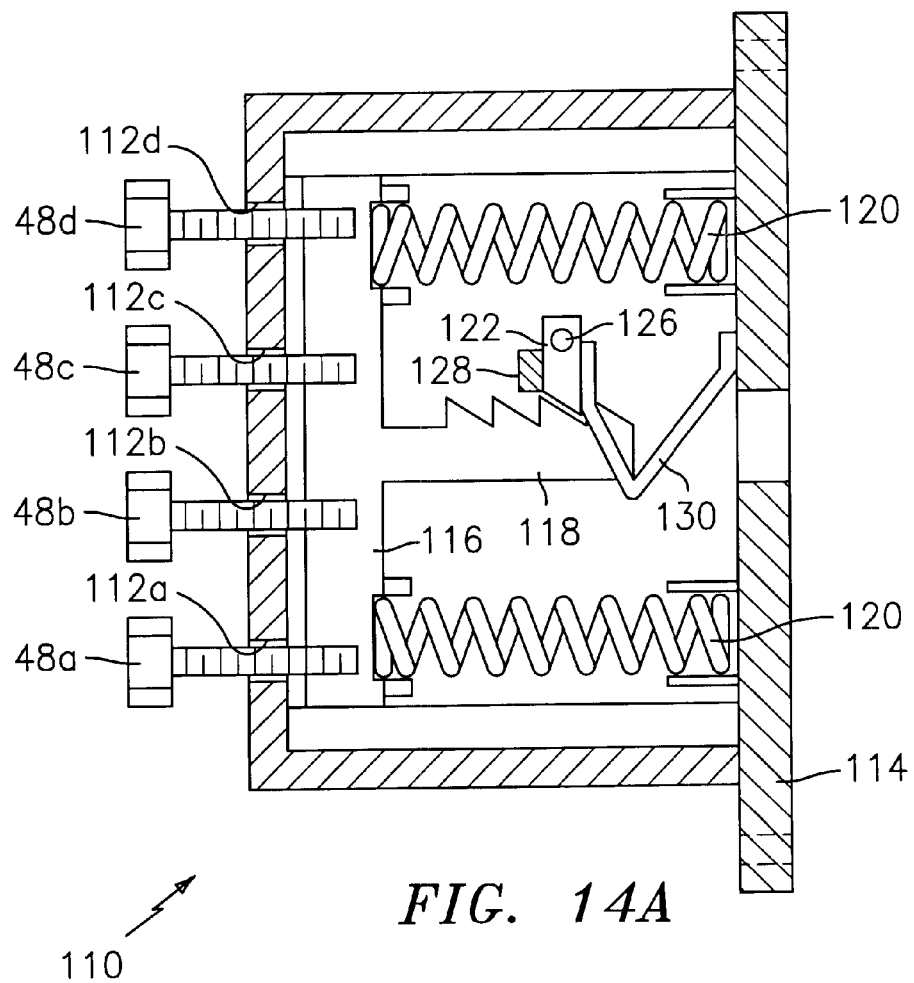
FIG. 14A is an elevation view, partly in cross-section, of a quick-release shelf-leg coupling adapter.
Figure 14B:
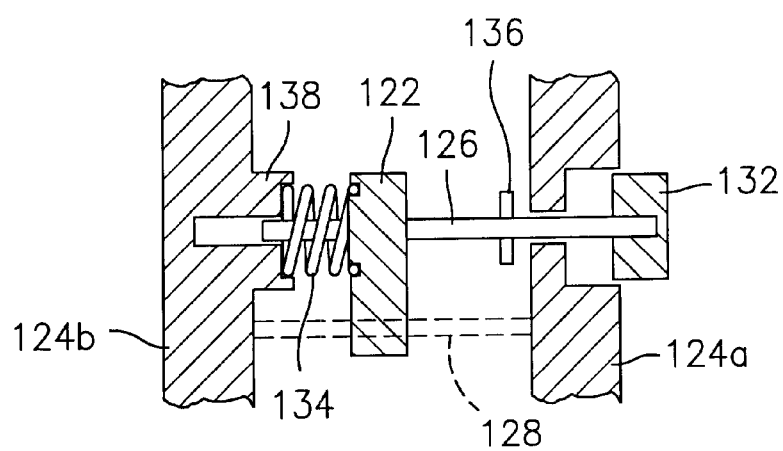
FIG. 14B is a cross-sectional plan view of a portion of the quick-release adapter shown in FIG. 14A.

FIGS. 14A and 14B show an internal quick-release mechanism. Here, a housing 110 is provided with four front, linearly-arrayed holes 112a–112d and a rear plate 114. A ratchet plate 116 having a rearwardly extending ratchet arm 118 attached thereto is slidably disposed within the housing 110. The four coupling bolts 48a–48d, screwed into the ratchet plate 116, extend respectively through the holes 112a–112d. The ratchet plate 116 is biased towards a first position, as shown in FIG. 14A, against an inside front of the housing 110, via one or more compression springs 120 extending between the ratchet plate 116 and the rear plate 114. A ratchet stop 122 is pivotally disposed between the side walls 124a, 124b of the housing 110 via a floating shaft 126 attached to the ratchet stop 122. Additionally, a stop bar 128 extends between the two side walls 124a, 124b to abut the ratchet stop 122. A leaf spring 130 is attached to the ratchet stop 122, and extends rearwards to contact the rear plate 114.

To secure a shelf leg against the outside front of the housing 110, the coupling bolts 48a–48d are inserted through the shelf leg holes, and the coupling bolts and attached ratchet plate 116 are moved rearwards against the action of the springs 120 (note that the springs 120 do not have to provide much biasing force) to bring the bolt heads into contact with the shelf leg. As the ratchet plate moves rearwards, the teeth of the ratchet arm 118 encounter the ratchet stop 122, which pivots rearwards in response. As the ratchet stop 122 pivots rearwards, the leaf spring 130 flexes, and, once the ratchet stop 122 clears a particular ratchet tooth, causes the ratchet stop 122 to pivot forwards against the stop bar 128. The ratchet plate 116 is prevented from moving forwards by the ratchet teeth of the ratchet arm 118 contacting the ratchet stop 122, and the ratchet stop 122 being prevented from moving forwards by the stop bar 128.

FIG. 14B shows a ratchet release mechanism. To release the ratchet mechanism, and thereby cause the ratchet plate 116 and coupling bolts 48a–48d to move forwards, a button 132 is attached to the floating shaft 126. The button 132 is positioned on the exterior of one of the housing walls 124a. The ratchet stop 122 is biased in a central position, so as to be aligned with the ratchet arm 118, via a spring 134 and stop 136. When the button 132 is pressed inwards, the floating shaft 126 and ratchet stop 122 move towards the opposite side wall 124b against the action of the spring 134. This causes the ratchet stop 122 to move out of alignment with the ratchet arm 118 (e.g., it moves to the side of the ratchet arm), thus allowing the springs 120 to move the ratchet plate 116 forwards. Extra space is provided in a shaft bearing area 138 to accommodate the moving shaft 126.

Figure 15A:
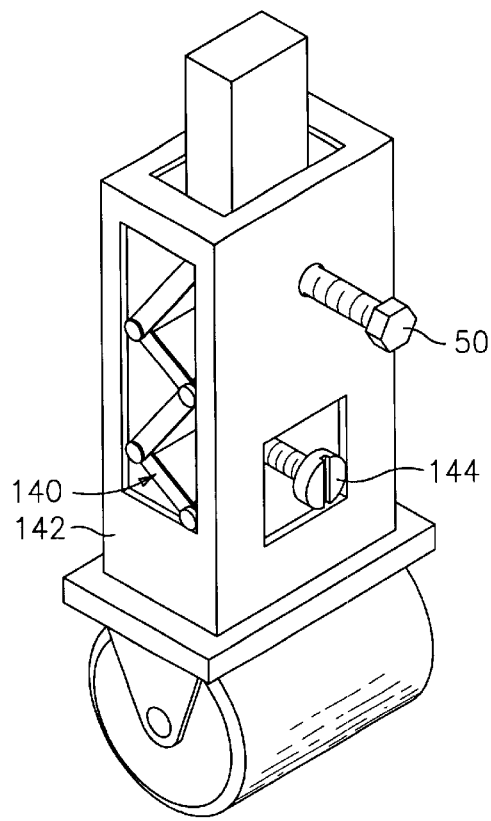
FIG. 15A is a perspective view of a scissor jack-equipped pedestal base.
Figure 15B:
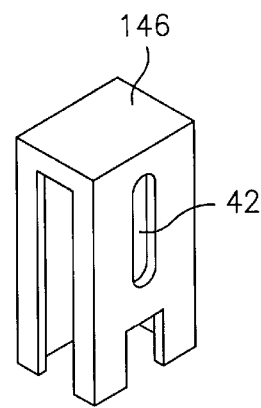
FIG. 15B is a perspective view of a lifting sleeve for use with the pedestal base shown in FIG. 15A.

The shelf dolly 20 can be provided with many different types of jacks. For example, it may be provided with a screw jack, as described above, or a scissor jack 140, as shown in FIG. 15A. Here, the scissor jack 140 is supported within a pedestal 142, which has side and top openings to accommodate the scissor-jack's arms and actuation mechanism 144 (typically, a shaft rotatable via a hand crank or the like). Additionally, as shown in FIG. 15B, a lifting sleeve 146 is provided with side openings to likewise accommodate the jack arms and actuation mechanism.

Figure 16:
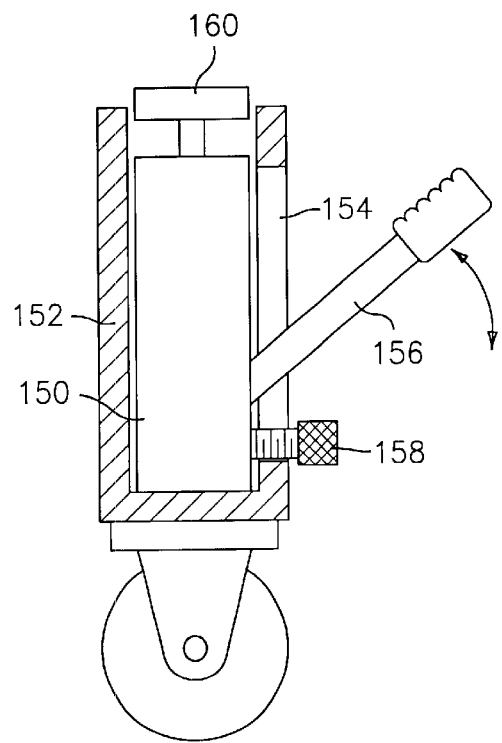
FIG. 16 is a side view, partly in section, of a hydraulic jack-equipped pedestal base.

FIG. 16 shows a manually-operated hydraulic jack. The hydraulic jack comprises a standard hydraulic cylinder 150 disposed in a pedestal 152 having an open side slot 154. A hand pump 156 is operably connected to the hydraulic cylinder 150 through the side slot 154, as is a release valve 158. To jack-up a lifting sleeve (not shown, but similar to the one shown in FIG. 15B), the hand pump 156 is operated in a conventional manner, thereby increasing pressure in the cylinder 150 and causing a piston 160 to move upwards. The lifting sleeve is lowered by opening the release valve 158.

FIGS. 17A and 17B are schematic diagrams of electrically-powered jacks that can be used in the shelf dolly in place of the manually-operated jacks described above. In FIG. 17A, a motor-powered jack 170 is operably coupled to a motor 172. The motor 172 is electrically connected to a power supply 174 via a conventional control unit 176, which includes suitable electronics for regulating power from the power supply 174 according to user input (e.g., control buttons or the like, not shown). The jack 170, motor 172, power supply 174 and control unit 176 are all housed in an appropriately-dimensioned pedestal housing (not shown). As shown in FIG. 17B, a hydraulic pump and cylinder 178 can be provided in place of the motor 172 and jack 170.

Figure 14C:
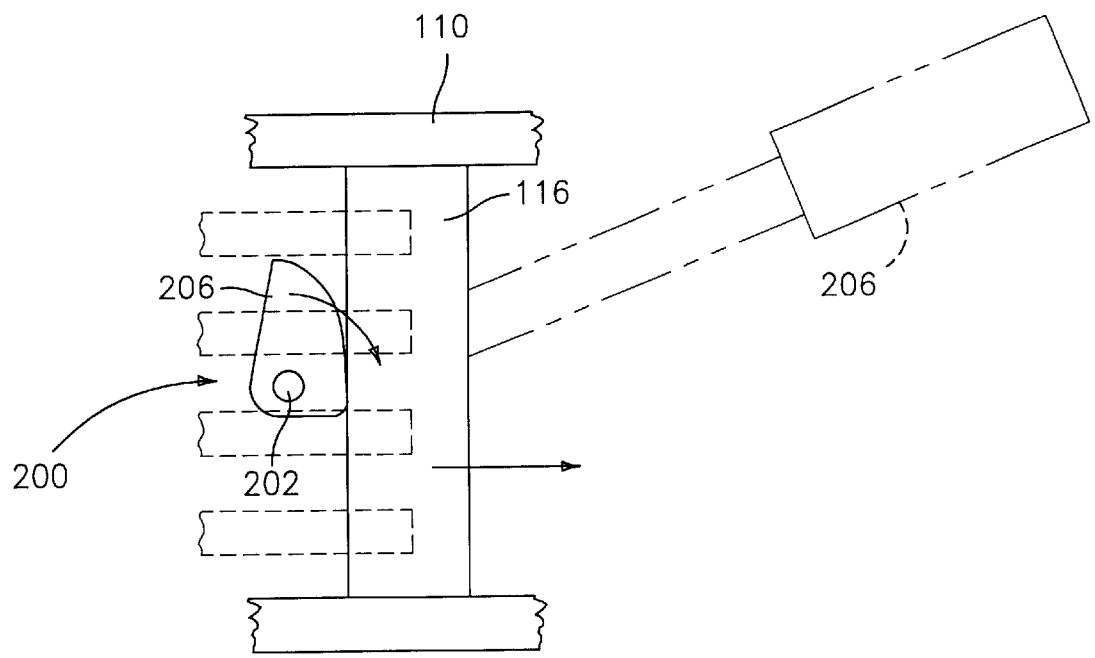
FIGS. 14C and 14D are cross-sectional elevation and plan views, respectively, of a lever actuation mechanism for use with the quick-release coupling adapter shown in FIGS. 14A and 14B.
Figure 14D:
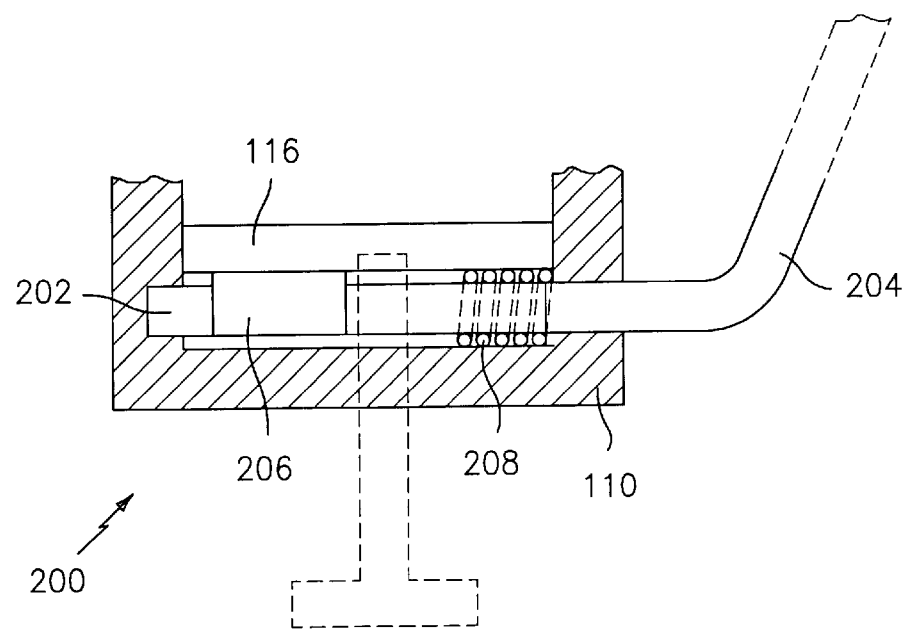

FIGS. 14C and 14D show a lever actuator 200 for use with the internal quick-release mechanism shown in FIGS. 14A and 14B. The lever actuator 200 comprises a shaft 202 rotatably supported by the housing 110 between the inner front of the housing and the ratchet plate 116. The shaft 202 is connected to an arm extension 204 located outside the housing 110 and capped by a handle 206. A cam 206 is attached to the shaft 202. Both the cam 206 and the shaft 202 are positioned to avoid the coupling bolts 48a–48d. For this purpose, the shaft 202 may be located above, below, or between the coupling bolts, and the cam 206 may be positioned between or to either side thereof. More than one cam can be provided. Additionally, the shaft 202, arm extension 204, and cam 206 are spring-biased in an un-actuated position (as shown in FIGS. 14A and 14B) via a torsion spring 208.

To use the lever actuator 200, a user pulls down on the arm extension 204, causing the shaft 202 and cam 206 to rotate. As the cam 206 rotates, it urges the ratchet plate 116 rearwards. If the arm extension 204 is released, the torsion spring 208 causes the arm extension 204, shaft 202, and cam 206 to rotate back to their un-actuated positions. This enables the springs 120 to push the ratchet plate 116 forwards (when the button 132 is pushed) without interference from the cam 206.

FIGS. 18A and 18B show a strap-and-buckle coupler 210 for use with irregularly-shaped shelf legs. The coupler 210 comprises a strap mainstay 212 dimensioned to receive a strap 214, at one end of which is affixed a buckle 216. The mainstay 212 may be attached to the sleeve tube 38 directly or via the offset bracket 44 or the like. FIG. 18B shows an alternative, dual-strap mainstay 218.

As should be appreciated, it may be difficult to attach the shelf dolly to certain objects. Therefore, various other couplers or related accessories can be provided. One example is shown in FIGS. 19A–19D, wherein the shelf dollies may be used to move a large, awkward object such as a lowboy 230. There, each shelf dolly is provided with a lift fork 232. The lift fork 232 comprises a hollow piece of square tubing 234 having an extension plate 236 attached perpendicularly to a bottom end thereof. The square tubing 234 is provided with linearly-arrayed coupling holes 238 along a side away from the extension plate 236. The top of the extension plate 236 and a side of the square tubing 234 near the extension plate 236 are covered with compact padding 240. Additionally, the remaining two sides of the square tubing 234 are providing with aligning strap through-holes 242.

Figure 19A:
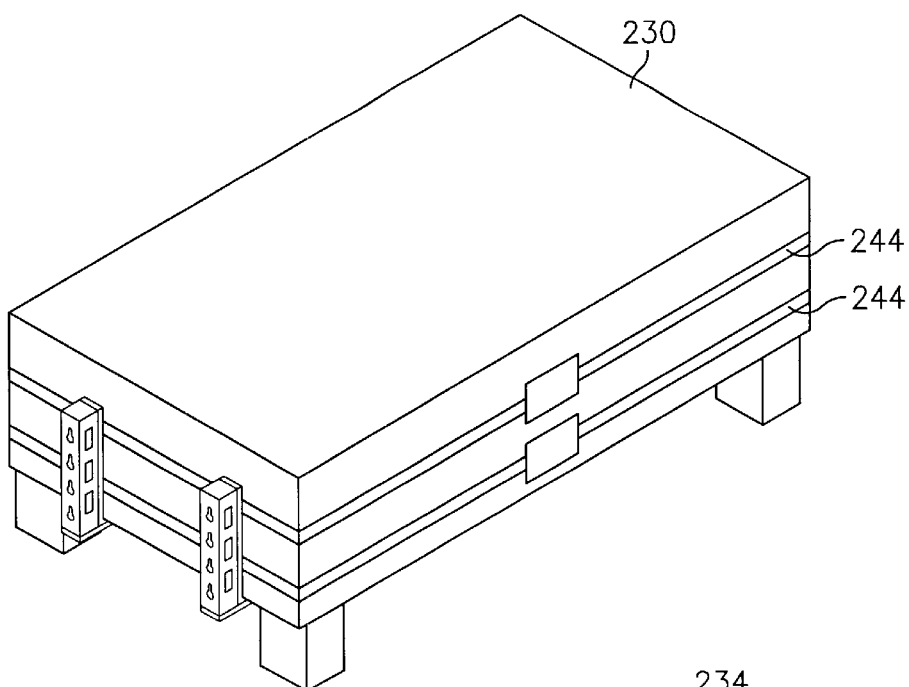
FIGS. 19A–19D are various views of a lift fork for use with the shelf dolly.
Figure 19B:
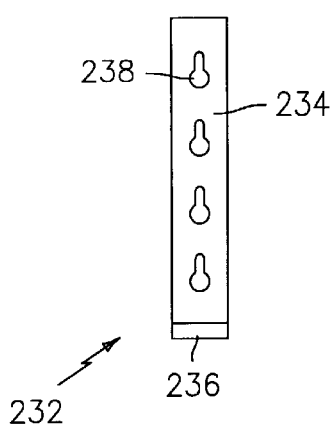
Figure 19C:
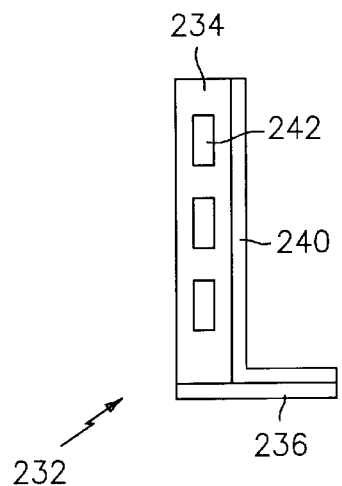

To move the lowboy 230 or other object, four of the lift forks 232 are placed against opposite side ends of the lowboy 230, with the extension plate 236 abutting an underside of the lowboy 230 and the padded side of the square tubing 234 abutting the side of the lowboy. The padding 240 reduces the likelihood of scratching. Subsequently, the lift forks 232 are strapped in place with one or more standard straps and buckles 244, as shown in FIG. 19A Then, shelf dollies are coupled to the lift forks 232 as described above, e.g., as if the lift forks were shelf legs. Since it may be difficult to simultaneously hold the lift forks in place before the shelf dollies are coupled thereto, the lift forks may be coupled to the shelf dollies first. Then, each shelf dolly can be appropriately positioned and held in place by lifting the lift sleeve (using the jack mechanism) just enough to bring the lift fork into tight contact against the lowboy 230 or other object.

Figure 19D:
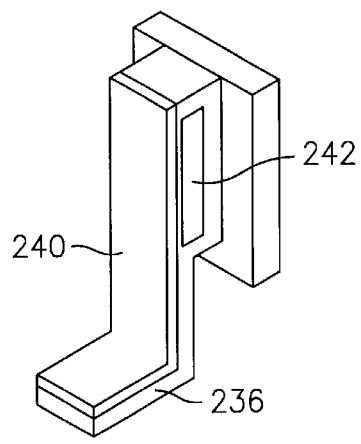

As illustrated in FIG. 19D, the lift fork may be may be provided as a coupler to be removably attached to the receiving bracket 60 of FIG. 5. Alternatively, it may be provided as a coupling adapter to be directly attached (permanently or removably) to the lifting sleeve 38.

All the aforementioned shelf dolly components may be made of any suitable material, depending on the maximum weight the shelf dolly is meant to bear. Suitable materials include, for example, steel, titanium, aluminum, heavy-duty plastic, and carbon composites.

Although the shelf dolly of the present invention has been shown as having certain coupling adapters for coupling the shelf dolly to a shelf leg, one of ordinary skill in the art will appreciate that any of a number of different coupling adapters could be provided, depending on the nature of the shelf or other object to be moved, without departing from the spirit and scope of the invention.

Also, although the shelf dolly has been shown as having certain jack mechanisms, one of ordinary skill in the art will appreciate that other jack mechanisms could be provided without departing from the spirit and scope of the invention.

Although the shelf dolly of the present invention has been illustrated as having a caster, one of ordinary skill in the art will appreciate that other wheel devices or friction reduction means for facilitating movement of the shelf dolly along a floor (e.g., rollers, slides, runners, treads, tracks, or the like) could be affixed to the pedestal base without departing from the spirit and scope of the invention.

Although the shelf dolly has been illustrated as having a lifting sleeve that "mates" with the pedestal base, one of ordinary skill in the art will appreciate that the lifting sleeve and pedestal base could have, e.g., different cross-sectional shapes, without departing from the spirit and scope of the invention.

Also, as should be appreciated, the shelf dolly of the present invention does not necessarily have to be provided with a lifting sleeve. For example, a hydraulic jack or scissor jack could be disposed within a wheeled support base, if necessary, or provided directly with a caster or the like, and the coupling adapter could be affixed to the jack's operational piston or lifting surface.

Since certain changes may be made in the above described shelf dolly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A device for lifting a shelf leg comprising:
   a. a base having a caster affixed thereto;
   b. a lifting sleeve slidably coupled to the base;
   c. a jack operably interfaced with the base and lifting sleeve for moving the sleeve relative to the base against a load; and
   d. a shelf-leg coupling adapter connected to the lifting sleeve for removably affixing the lifting sleeve to shelf leg, said shelf-leg coupling adapter comprising an offset bracket connected to the lifting sleeve and a plurality of bolts operably extending through the offset bracket, wherein to removably affix the lifting sleeve to the shelf leg the bolts are positioned within apertures provided in the shelf leg and are screwed inwards until the shelf leg is compressed between head portions of the bolts and the offset bracket.

2. The device for lifting a shelf leg of claim 1 wherein the jack is a screw jack.

3. The device for lifting a shelf leg of claim 2 wherein the screw jack comprises a bolt operably extending through a top end of the lifting sleeve, wherein to move the sleeve relative to the base the bolt is screwed downwards against a top of the base.

4. The device for lifting a shelf leg of claim 1 wherein the lifting sleeve is slidably coupled to the base by way of a bolt removably affixed to the base and extending through a longitudinal slot provided in the lifting sleeve.

5. A device or lifting a shelf leg comprising:
  a. a caster-foot pedestal base;
  b. a sleeve slidably disposed over the pedestal base;
  c. a jack operably interfaced with the base and sleeve for moving the sleeve relative to the base against a load; and
  d. a shelf-leg coupling adapter connected to the sleeve for removably connecting the sleeve to a shelf leg, said shelf-leg coupling adapter comprising an offset bracket connected to the sleeve and a plurality of bolts operably extending through the offset bracket, wherein to removably affix the sleeve to the shelf leg the bolts are positioned within apertures provided in the shelf leg and are screwed inwards until the shelf leg is compressed between head portions of the bolts and the offset bracket.

6. The device for lifting a shelf leg of claim 5 wherein the jack is a screw jack.

7. The device for lifting a shelf leg of claim 6 wherein the screw jack comprises a bolt operably extending through a top end of the sleeve, wherein to move the sleeve relative to the base the bolt is screwed downwards against a top of the base.

8. A lifting device comprising:
  a. a wheeled base;
  b. a sleeve slidably positioned over the base and having a coupling adapter for removably connecting the sleeve to an object to be lifted; and
  c. a jack operably interfaced with the base and sleeve for moving the sleeve relative to the base against a load, wherein:
  d. the coupling adapter comprises an offset bracket and a plurality of bolts operably extending through the offset bracket, wherein to removably affix the sleeve to the object to be lifted the bolts are positioned within apertures provided in the object to be lifted and are screwed inwards until a portion of the object to be lifted is compressed between head portions of the bolts and the offset bracket.

9. A lifting device comprising:
  a. a wheeled base;
  b. a sleeve slidably positioned over the base; wherein the sleeve has an offset portion
  c. a jack operably interfaced with the base and sleeve for moving the sleeve relative to the base; and
  d. a plurality of bolt-shaped temporary engaging elements each having a shank portion operably interfaced with the sleeve offset portion and a head portion attached to the shank portion, wherein to removably affix the sleeve to an object to be lifted the temporary engaging elements are positioned within apertures provided in the object to be lifted and are moved inwards until a portion of the object to be lifted is held between the head portions of the bolt-shaped temporary engaging elements, and the sleeve offset portion.

10. A method of moving a shelf comprising the steps of:
  a. temporarily affixing at least three shelf lifting devices to the shelf, each of said shelf lifting devices comprising:
   i. a wheeled base;
   ii. a sleeve slidably coupled to the base;
   iii. a jack operably interfaced with the base and sleeve for moving the sleeve relative to the base against a load; and
   iv. a shelf coupling adapter connected to the sleeve for removably affixing the sleeve to the shelf, said shelf coupling adapter comprising an offset bracket and a plurality of bolts operably extending through the offset bracket, wherein to removable affix the sleeve to the shelf the bolts are positioned within apertures provided in the shelf and are moved inwards until at least a portion of the shelf is compressed between head portions of the bolts and the offset bracket;
  b. actuating the jack portions of the shelf lifting devices to raise the shelf off the floor;
  c. rolling the shelf to a new location by way of the wheeled bases;
  d. de-actuating the jack portions of the shelf lifting devices to lower the shelf to the floor; and
  e. removing the lifting devices from the shelf.

* * * * *

UNITED STATES PATENT AND TRADEMARK OFFICE
CERTIFICATE OF CORRECTION

PATENT NO. : 6,644,626 B2 Page 1 of 1
DATED : November 11, 2003
INVENTOR(S) : Matthew D. Baril It is certified that error appears in the above-identified patent and that said Letters Patent is hereby corrected as shown below:

<u>Column 10,</u>
Line 29, change "removable" to -- removably --.

Signed and Sealed this

Thirteenth Day of January, 2004

JON W. DUDAS
*Acting Director of the United States Patent and Trademark Office*